(12) United States Patent
Junig et al.

(10) Patent No.: US 8,888,634 B2
(45) Date of Patent: Nov. 18, 2014

(54) TOOTHED PLATE-LINK CHAIN

(75) Inventors: Marcus Junig, Bühl (DE); Anton Simonov, Bühl (DE); Olga Ispolatova, Bühl (DE); Michael Pichura, Bühl (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 1217 days.

(21) Appl. No.: 12/069,909

(22) Filed: Feb. 13, 2008

(65) Prior Publication Data

US 2009/0192000 A1 Jul. 30, 2009

Related U.S. Application Data

(60) Provisional application No. 60/902,138, filed on Feb. 13, 2007.

(51) Int. Cl.
*F16G 13/04* (2006.01)
(52) U.S. Cl.
USPC .......................................... 474/215; 474/212
(58) Field of Classification Search
USPC .................................................. 474/212, 215
See application file for complete search history.

(56) References Cited

U.S. PATENT DOCUMENTS

| | | | | |
|---|---|---|---|---|
| 757,762 | A | * | 4/1904 | Morse ............................ 474/216 |
| 799,073 | A | * | 9/1905 | Morse ............................ 474/216 |
| RE12,844 | E | * | 8/1908 | Morse ............................ 474/216 |
| 1,755,887 | A | * | 4/1930 | Morse ............................ 474/216 |
| 1,770,989 | A | * | 7/1930 | Morse ............................ 474/216 |
| 3,742,776 | A | * | 7/1973 | Avramidis .................... 474/215 |
| 4,010,656 | A | * | 3/1977 | Jeffrey .......................... 474/215 |
| 4,130,026 | A | * | 12/1978 | Jeffrey .......................... 474/215 |
| 4,342,560 | A | * | 8/1982 | Ledvina et al. ............... 474/157 |
| 4,345,904 | A | * | 8/1982 | Numazawa et al. .......... 474/215 |
| 4,509,323 | A | * | 4/1985 | Ledvina et al. ...................... 59/8 |
| 4,759,740 | A | * | 7/1988 | Cradduck ..................... 474/212 |
| 5,026,331 | A | * | 6/1991 | Sugimoto et al. ............ 474/214 |
| 5,236,399 | A | * | 8/1993 | Sugimoto et al. ............ 474/215 |
| 5,453,059 | A | * | 9/1995 | Avramidis et al. ........... 474/212 |
| 5,588,926 | A | * | 12/1996 | Mott et al. .................... 474/212 |
| 5,651,746 | A | | 7/1997 | Okuda .......................... 474/215 |
| 5,758,484 | A | * | 6/1998 | Ledvina et al. ...................... 59/5 |

(Continued)

FOREIGN PATENT DOCUMENTS

| | | |
|---|---|---|
| EP | 1 036 953 A1 | 9/2000 |
| EP | 1 510 727 A2 | 3/2005 |
| GB | 2 360 343 A | 9/2001 |

*Primary Examiner* — Michael Mansen
*Assistant Examiner* — Henry Liu
(74) *Attorney, Agent, or Firm* — Alfred J. Mangels

(57) ABSTRACT

A toothed plate-link chain having a plurality of link plates that form chain links in the transverse direction of the chain. The link plates of laterally adjacent chain links partially overlap, and the chain links are hingedly connected to each other by hinge pins that extend through receiving openings in overlap regions of the link plates. At least some of the link plates have plate teeth, and some of the link plates have a modified form to reduce the effect of impact impulses of the link plates on the tooth flanks of a toothed wheel about which the chain passes. As a result, the magnitude of the meshing impulses and the times during which they act on the toothed wheel are modified to thereby reduce structure-borne noise.

8 Claims, 4 Drawing Sheets

(56) References Cited

U.S. PATENT DOCUMENTS

| | | | |
|---|---|---|---|
| 6,112,510 A * | 9/2000 | Ichikawa et al. | 59/5 |
| 6,186,921 B1 * | 2/2001 | Kotera | 474/215 |
| 6,244,983 B1 * | 6/2001 | Matsuda | 474/155 |
| 6,325,735 B1 * | 12/2001 | Kanehira et al. | 474/212 |
| 6,334,828 B1 * | 1/2002 | Suzuki | 474/212 |
| 6,419,604 B2 * | 7/2002 | Saito et al. | 474/213 |
| 6,533,107 B2 * | 3/2003 | Suzuki et al. | 198/834 |
| 6,663,522 B2 * | 12/2003 | Horie | 474/212 |
| 7,048,664 B2 * | 5/2006 | Kotera | 474/212 |
| 2003/0119614 A1 | 6/2003 | Saitoh | 474/113 |
| 2006/0293139 A1 * | 12/2006 | Junig et al. | 474/215 |
| 2007/0105676 A1 * | 5/2007 | Vietoris | 474/215 |
| 2007/0155564 A1 * | 7/2007 | Ledvina et al. | 474/215 |

\* cited by examiner

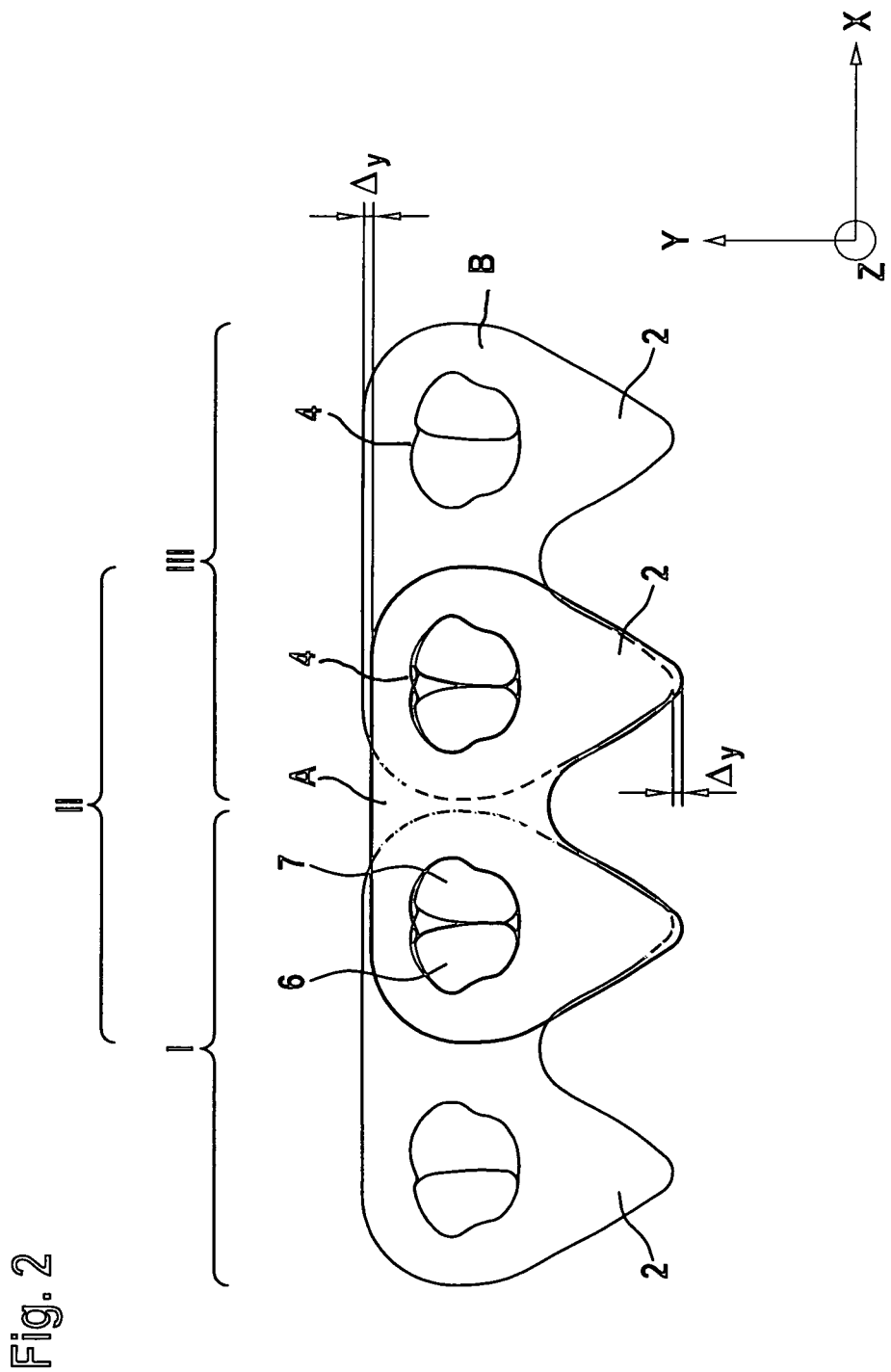

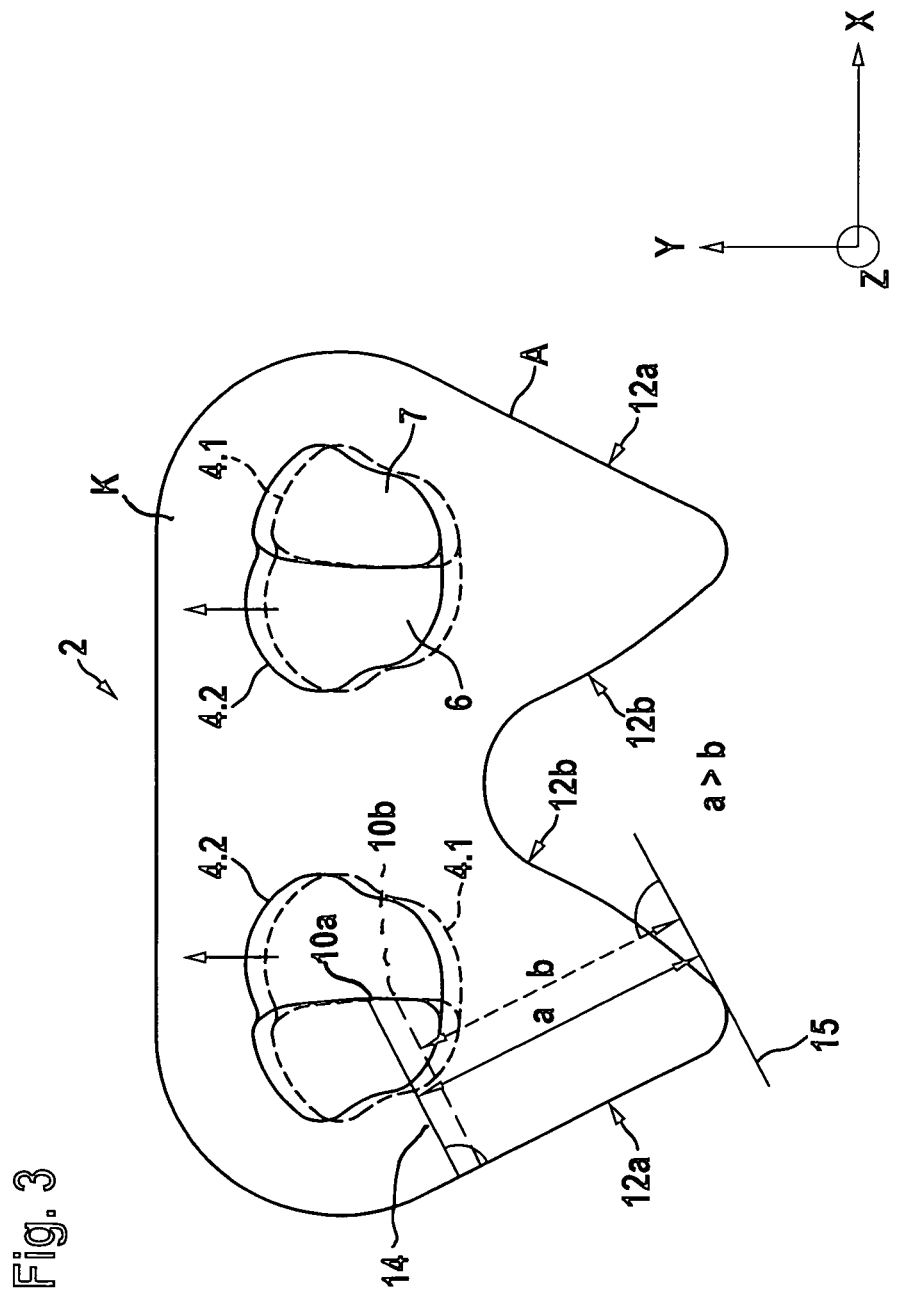

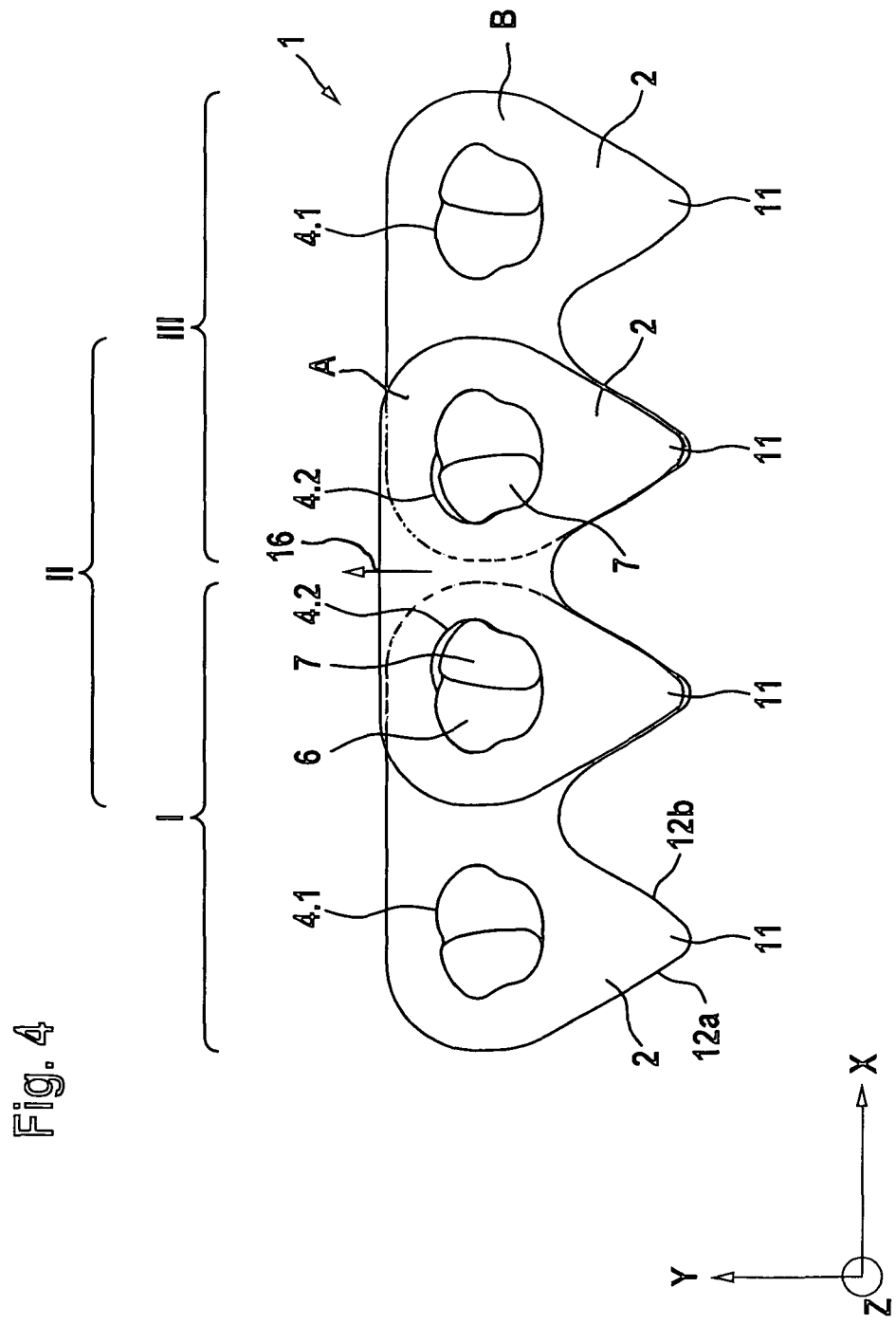

TOOTHED PLATE-LINK CHAIN

BACKGROUND OF THE INVENTION

1. Field of the Invention

The present invention relates to a toothed plate-link chain having a plurality of link plates that form chain links in the transverse direction. The link plates of adjacent chain links partially overlap, and the chain links are hingedly connected to each other by hinge pins that extend through receiving openings in an overlap region of the link plates.

2. Description of the Related Art

Toothed plate-link chains are known in many variants from the existing art. With a toothed plate-link chain that runs between two toothed wheels at a fixed transmission ratio, the impact impulses of the link plates on the tooth flanks of the toothed wheels causes a structure-borne noise to be introduced into the system, which results in a sound emission. The tooth meshing frequencies that arise due to those impact impulses are present at all rotational speeds. The rotational speed of the chain drive determines the frequency, which becomes higher the faster the chain drive rotates.

It is known to improve the acoustic properties of a toothed plate-link chain by randomizing the link plate lengths or randomizing the tooth flank contour. It is also known to effect an optimization of the sound emissions through parallel positioning of two toothed chains which run at an offset of half a link plate length to each other.

An object of the present invention is to reduce the effect of impact impulses of the link plates on the tooth flanks, and thus to optimize the magnitude of the meshing impulses and the times during which they act on the toothed wheel.

SUMMARY OF THE INVENTION

The object is achieved in accordance with the present invention by a toothed plate-link chain having a plurality of link plates that form chain links in the transverse direction. The link plates of adjacent chain links partially overlap, and the chain links are hingedly connected to each other by hinge pins that extend through receiving openings in an overlap region of the link plates. At least some of the link plates have plate teeth, with part of the link plates having a modified plate tooth profile. In some chain links, the modified profiles effect a change in the geometry of the tooth meshing between the toothed plate-link chain and an encircled toothed wheel as the chain meshes with the toothed wheel, compared to the other chain links. The link plates having a modified profile thus mesh with the toothed wheel at a different interval and at a relatively deferred point in time, compared to the link plates without modified profiles. The meshing times are thereby situated unevenly around the circumference of the plate-link chain, so that when the toothed chain drive is rotating at a constant speed, for example, non-uniform meshing times of the respective chain links result. This prevents regular excitation of the plate-link chain to strand vibrations, which reduces the strand vibrations, particularly resonance, because of the decreased excitation.

Preferably, part of the chain links include a first link plate type, and a different part of the chain links include the first link plate type as well as a second link plate type with a modified profile of the link plate teeth compared to the first link plate type. Thus, the link plates with modified profiles are arranged irregularly in the plate-link chain. There can be a provision that part of the chain links include only the first link plate type, and a different part of the chain links contain only the second link plate type having a modified profile, of the link plate teeth compared to the first link plate type. So, in that case, complete chain links are made either of the link plates without modified profiles or of the link plates with modified profiles.

The toothed plate-link chain can preferably include additional guide plates, which are either situated within the rows of link plates of the toothed plate-link chain or are situated at the lateral margins of the toothed plate-link chain as guide link plates.

Preferably, the outer contour of all link plates is the same, and that the modified profile is effected by shifting the arrangement of the receiving openings for the hinge pins. Accordingly, the link plates having modified profiles differ from the link plates without modified profiles only in the position of the receiving openings in the link plates. Preferably, the receiving openings of the link plates having modified profiles are moved to an upper side of the chain. As a result, the teeth of those link plates extend further in the direction of the underside of the chain than is the case with the link plates without modified profiles. As a result, the link plates with modified profiles are more likely to come in contact with an encircled toothed wheel sooner as the link plate meshes with the toothed wheel than is the case with link plates without modified profiles.

In an alternative embodiment, the outer contour of all link plates is the same, and the modification of the profiles is effected by an enlargement of the receiving openings for the hinge pins in the link plates, whereby the play of the hinge pins in the receiving openings is increased. In addition, or alternatively to the previously identified shifting of the position of the receiving openings, the apertures are also enlarged, so that additional play of the link plates results compared to the hinge pins or to the rocker members of which the link pins are made.

BRIEF DESCRIPTION OF THE DRAWINGS

The structure, operation, and advantages of the present invention will become further apparent upon consideration of the following description, taken in conjunction with the accompanying drawings in which:

FIG. 2 is a side view of a toothed plate-link chain in accordance with an embodiment of the present invention, with a first exemplary embodiment of a link plate in accordance with the invention;

FIG. 3 is an enlarged side view of a link plate showing the positions of receiving openings in a known toothed plate-link chain and also the positions of receiving openings in accordance with the first exemplary embodiment of the present invention; and FIG. 4 is a side view of a second exemplary embodiment of a toothed plate-link chain in accordance with the present invention, with a second exemplary embodiment of a link plate in accordance with the invention.

DESCRIPTION OF THE PREFERRED EMBODIMENTS

Figure 1:
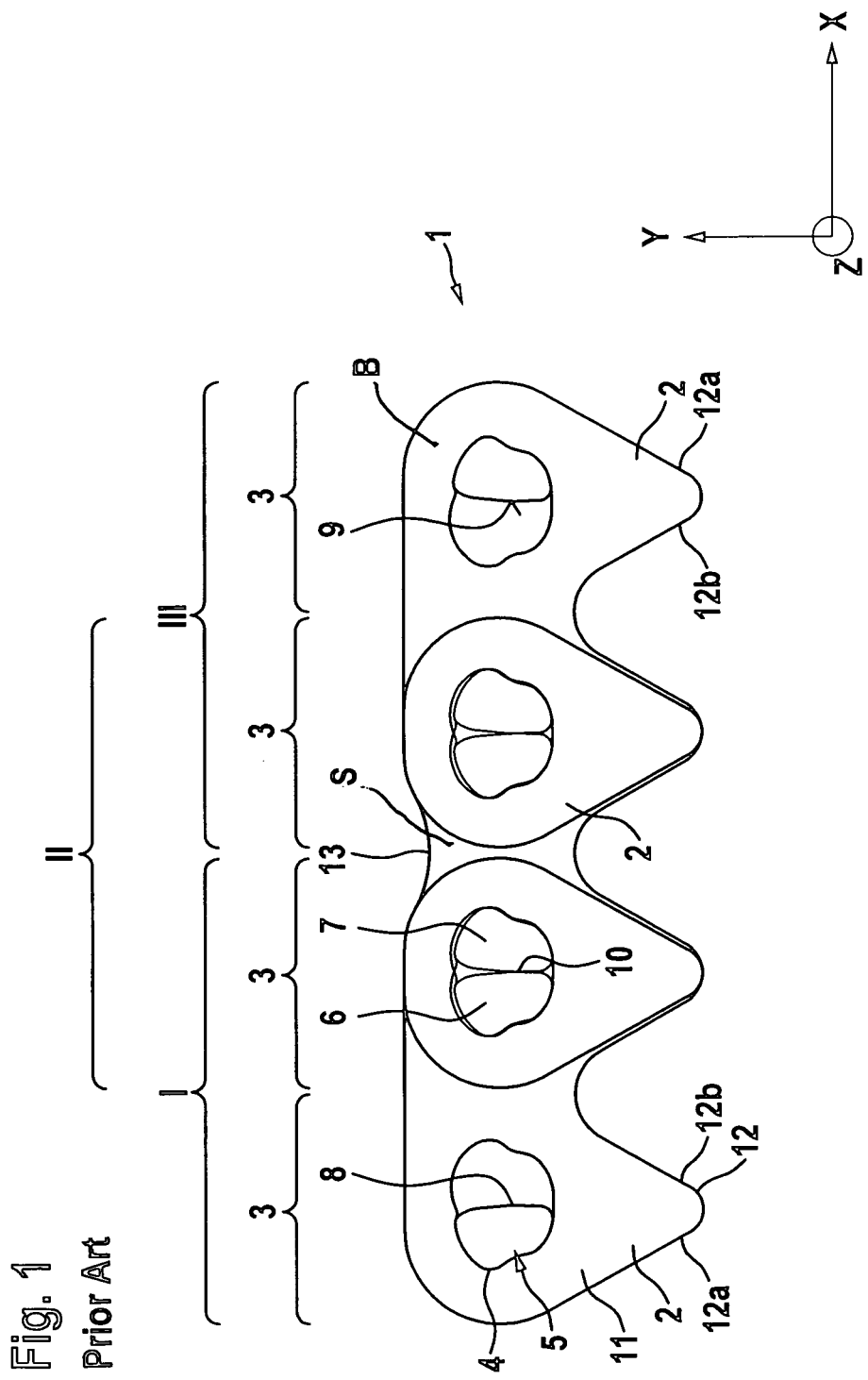
FIG. 1 is a side view of a known toothed plate-link chain.

FIG. 1 shows a side view of a portion of a known toothed plate-link chain 1. The figure shows three adjacent chain links, designated I, II, and III. To differentiate indications of direction, the direction designated in FIG. 1 as X will be referred to hereinafter as the longitudinal direction of the chain, the direction designated as Y will be referred to as the height direction of the chain, and the direction designated as Z will be referred to as the transverse direction of the chain.

The height direction Y will be designated in the direction of the arrow Y as the direction of the upper side of the chain, and opposite the direction of the arrow Y as the direction of the lower side of the chain.

Chain links I, II, and III of the plate-link chain 1 include a plurality of link plates 2 that are stacked side-by-side at spaced intervals from each other in the transverse direction Z of the plate-link chain, and thus form chain links. The link plates 2 of adjacent chain links overlap each other in overlap regions 3. Receiving openings 4 through which hinge pins 5 extend are situated in the overlap regions 3 of the link plates 4. Adjacent chain links are hingedly connected with each other by means of the hinge pins 5. The hinge pins 5 include two rocker members 6, 7, with each of the rocker members 6, 7 being connected to the link plates 2 of one of the chain links.

Rocker members 6, 7 roll against each other along rolling surfaces 8, 9. In the view shown in FIG. 1, rocker member 7 is connected to the link plates of chain link I, and rocker member 6 is connected to the link plates of chain link II. If tension is exerted on the toothed plate-link chain in chain longitudinal direction X, then rolling surfaces 8, 9 of adjacent rocker members are pressed against each other, so that they touch each other at rocker member contact points 10. The rocker member contact point 10 in the two-dimensional representation in FIG. 1 is a point; obviously, in the transverse direction Z, along the rocker members 6, 7, and in a three-dimensional view, it extends and forms a contact line.

The chain links 2 each include two teeth 11, which each have tooth flanks 12. The tooth flanks are differentiated as an outer flank 12a and an inner flank 12b. Not shown in FIG. 1 and the subsequent figures are guide plates, which can be situated within a plate stack and serve to guide the toothed plate-link chain on a toothed wheel that is provided with a circumferential groove. Alternatively, the guide plates can be cover plates that are situated on the outer sides of the toothed plate-link chain 1 in the transverse direction Z, and effect guidance of the chain in the axial direction of a toothed wheel by engaging the ends of the teeth of the toothed wheel.

FIG. 1 illustrates a known measure for reducing the meshing impulse as the toothed plate-link chain 1 meshes with a toothed wheel as it passes around it. Chain links I, II, III, etc. are made of toothed plates, whose teeth 11 have differing outer contours of the tooth flanks 12. Thus, two different types of link plates are used in the known toothed plate-link chain, namely a first link plate type B having an outer contour of the tooth flanks of type B, and a second link plate type S having an outer contour of the tooth flanks of type S. The two link plate types B and S thus have a different outer contour, with the differences in the outer contour existing only in the region of the tooth flanks. To distinguish the two link plate types, one of the link plate types has an indentation 13, for example, as a distinguishing feature that is used when assembling the plate-link chain 1.

FIG. 2 shows a plate-link chain in accordance with the present invention in a side view similar to FIG. 1. Here also, two link plate types are used, namely a first link plate type B, which is identical to the first link plate type B shown in FIG. 1, and a second link plate type A, which has a profile displacement $\Delta y$ of the tooth flanks 12 or of the teeth 11. In this case a profile displacement $\Delta y$ means a complete shifting of the tooth profile of second link plate type A relative to the tooth profile of first link plate type B, and thus of the outer contour of the teeth 11 in the height direction Y of the plate-link chain 1. The profile displacement is accomplished by the fact that while the outer contours of all of the link plates 2 are the same, the receiving openings 4 in the second link plate type A are shifted relative to the receiving openings 4 in the first link plate type. The possibility exists here that the inner contour of the receiving aperture 4 is identical, so that the receiving opening 4 of the two link plate types is only positioned differently within the link plate, or that the receiving openings 4 themselves have different inner contours. Those two variant embodiments will be described below in connection with FIGS. 3 and 4.

FIG. 3 shows the outer contour K of an exemplary embodiment of a link plate, where the outer contour K is identical for both link plate types as shown previously. The two link plate types differ in the positions relative to the link plate outer contour of the receiving openings, shown by a dashed line 4.1 for the first link plate type B and shown by a solid line 4.2 for the second link plate type A. The positions of the receiving openings 4.1 or 4.2 can be defined relative to the rocker member contact points 10 when plate-link chain 1 is extended.

In the exemplary embodiment shown in FIG. 3 it is assumed that the outer flank 12a is essentially a straight-line segment. The distance from the tooth flank 12 to the rocker member contact point 10a is defined by the distance between a straight line 14 that is perpendicular to the outer flank 12a and that passes through the rocker member contact point 10a, and a straight line 15 that is parallel to the perpendicular straight line 14 and that touches the tooth flank 12. First link plate type B has a perpendicular distance b from the tooth flank to the rocker member contact point 10b, which is a smaller distance than the perpendicular distance a from the tooth flank to the rocker member contact point 10a of second link plate type A. The two link plate types can therefore be produced from the same semi-finished stock, by placing a receiving aperture 4 at different locations. In addition, a distinguishing feature such as an indentation 13 (see FIG. 1) or the like can be placed on one of the two link plate types, as is customary in the existing art.

FIG. 4 shows a second exemplary embodiment of a plate-link chain in accordance with the present invention. The profile displacement is effected by differing inner contours of the receiving openings 4. The receiving openings 4.2 of the second link plate type A have an inner contour that allows the hinge pins 5 greater play within the openings. That can be accomplished by increasing the play of the rocker members of the adjacent chain links, for example. That is illustrated in FIG. 4 on the basis of three chain links I, II, III corresponding to the chain link designation in FIG. 1. The link plates 2 of chain link II have receiving openings 4.2 that are enlarged in the direction of the top side of the chain, and thus allow greater play for the associated rocker member 7. That shifts the link plate 2 of chain link II toward the top surface of the chain, as identified by an arrow 16. The tooth flanks 12 of the second link plate type A then do not engage an encircled toothed wheel as early as the tooth flanks of the link plates of the first link plate type B.

A plate-link chain 1 can be made up of link plates that are each of only one type. Therefore, there are then chain links that include only the first type of link plate, as well as chain links that include only the second type of link plate. The order of the chain links is arbitrary in this case; they can be situated alternately, or, for example, every second, or every third, or every fourth, etc., chain link can be composed of the one type of link plate and the other chain links can be composed of the other type of link plate. It is equally possible, however, to install the different link plate types in a mixed order in the chain links. For example, it is possible to use one link plate of a chain link of the one link plate type and all other link plates of the other link plate type. At the same time it is possible for example to equip only a small part of the chain links with the second link plate type and otherwise to use only the first link plate type, so that disturbances arising from the meshing impulses can be brought about selectively to prevent chain strand vibrations.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A toothed plate-link chain having a plurality of link plates that form chain links in a transverse direction of the chain, said chain comprising: a plurality of chain links composed of side-by-side link plates, wherein link plates of laterally adjacent chain links partially overlap; a plurality of laterally-extending hinge pins that pass through respective hinge-pin-receiving openings provided in the link plates so that laterally adjacent chain links are hingedly connected to the hinge pins, and the link plates of adjacent chain links are adjacent to each other at an overlap region of the adjacent link plates; wherein at least some of the link plates have link plate teeth and the link plates with teeth are of identical size and have the same outer peripheral form, wherein the teeth are defined by inner and outer tooth flanks, wherein the outer tooth flanks include straight-line segments, and wherein at least one of the link plates with teeth has a different link plate tooth outer flank position relative to the hinge-pin-receiving openings, as compared with the tooth outer flank position relative to the hinge-pin-receiving openings of other link plates that have teeth, wherein at least one of the link plates having teeth includes hinge-pin-receiving openings that are displaced relative to an upper side of the link plate outer periphery as compared with positions of the hinge-pin-receiving openings of other link plates having teeth, and in a direction opposite from the direction in which the link plate teeth extend, as compared with positions relative to the link plate outer periphery of hinge-pin-receiving openings of other link plates having teeth, to provide a tooth profile displacement of a first link plate tooth relative to the tooth profile of a second link plate tooth to vary tooth impact pulse timing as the chain passes around a toothed wheel to reduce chain excitation and resulting chain strand vibrations as the link plate teeth mesh with and impact the teeth of the toothed wheel.

2. A toothed plate-link chain in accordance with claim 1, wherein the toothed plate-link chain includes guide plates for guiding the chain as it passes around the toothed wheel.

3. A toothed plate-link chain in accordance with claim 2, wherein the guide plates are cover plates positioned on at least one lateral side of the chain.

4. A toothed plate-link chain in accordance with claim 1, wherein at least one of the link plates having teeth includes hinge-pin-receiving openings that are larger than hinge-pin-receiving openings in other link plates having teeth.

5. A toothed plate-link chain having a plurality of link plates that form chain links in a transverse direction of the chain, said chain comprising: a plurality of chain links composed of side-by-side link plates, wherein link plates of laterally adjacent chain links partially overlap; a plurality of laterally-extending hinge pins that pass through respective hinge-pin-receiving openings provided in the link plates so that laterally adjacent chain links are hingedly connected to the hinge pins, and the link plates of adjacent chain links are adjacent to each other at an overlap region of the adjacent link plates; wherein at least some of the link plates have link plate teeth and the link plates with teeth are of identical size and have the same outer peripheral form, wherein the teeth are defined by inner and outer tooth flanks, wherein the outer tooth flanks include straight-line segments, and wherein at least one of the link plates with teeth has a different link plate tooth outer flank position relative to the hinge-pin-receiving openings, as compared with the tooth outer flank position relative to the hinge-pin-receiving openings of other link plates that have teeth, wherein at least one of the link plates having teeth has hinge-pin-receiving openings that have the same form as hinge pin-receiving openings of other link plates having teeth, and wherein positions of the hinge-pin-receiving openings of the at least one of the link plates having teeth are spaced a different distance from an upper edge of the chain as compared with spacings relative to the upper edge of the chain of hinge-pin-receiving openings in other link plates having teeth, to provide a tooth profile displacement of a first link plate tooth relative to the tooth profile of a second link plate tooth to vary tooth impact pulse timing as the chain passes around a toothed wheel to reduce chain excitation and resulting chain strand vibrations as the link plate teeth mesh with and impact the teeth of the toothed wheel.

6. A toothed plate-link chain in accordance with claim 5, wherein at least one of the link plates having teeth includes hinge-pin-receiving openings that are larger than hinge-pin-receiving openings in other link plates having teeth.

7. A toothed plate-link chain in accordance with claim 5, wherein the toothed plate-link chain includes guide plates for guiding the chain as it passes around the toothed wheel.

8. A toothed plate-link chain in accordance with claim 7, wherein the guide plates are cover plates positioned on at least one lateral side of the chain.

* * * * *